G. S. ZIGENFUSS.
Wagon-Brake.
No 65,983. Patented June 18, 1867.
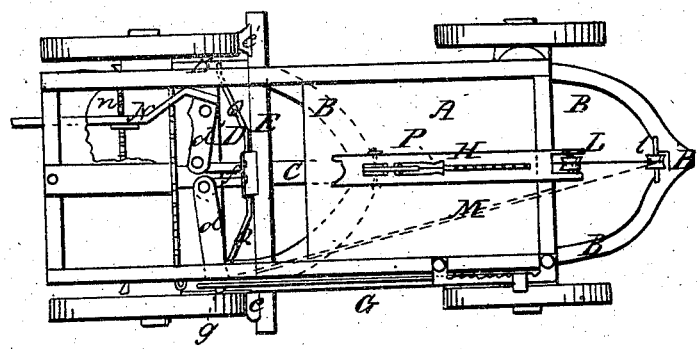
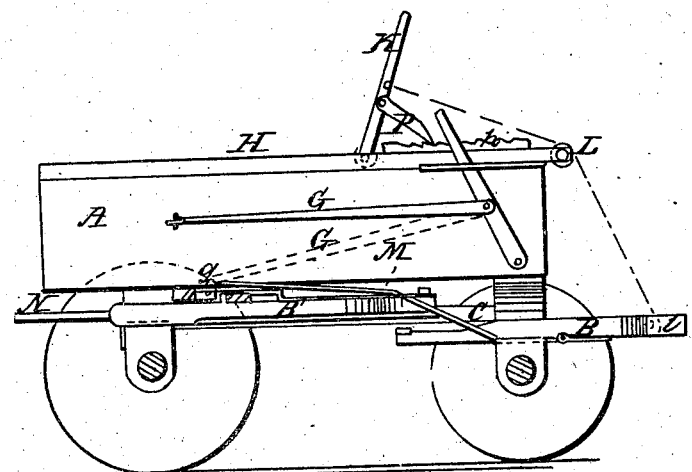
Witnesses:
Theo Tusche
Wm Truwin
Inventor:
G. S. Zigenfuss
Per Munn & Co
Attorneys

United States Patent Office.

GEORGE S. ZIEGENFUSS, OF DOYLESTOWN, PENNSYLVANIA.

*Letters Patent No. 65,983, dated June 18, 1867.*

IMPROVEMENT IN WAGON-BRAKES.

*The Schedule referred to in these Letters Patent and making part of the same.*

TO ALL WHOM IT MAY CONCERN:

Be it known that I, GEORGE S. ZEIGENFUSS, of Doylestown, in the county of Bucks, and State of Pennsylvania, have invented a new and useful Improvement in Brakes for Wagons and other Vehicles; and I do hereby declare that the following is a full, clear, and exact description thereof, which will enable others skilled in the art to make and use the same, reference being had to the accompanying drawings, forming part of this specification.

This invention relates to an improvement in brakes for wagons and other vehicles, and consists in an arrangement for locking the wheels from the top of a load or side or rear of the vehicle, or from two or more of the said positions upon the vehicle together, as may be most convenient, independently of each other. In the accompanying drawings—

Figure 1 is a top view of a wagon carrying my improved brake; and

Figure 2 is a side view thereof.

In fig. 1 part of the bottom of the wagon is broken out to show the brake connections and rear brake.

Similar letters of reference indicate like parts.

A is the wagon or cart. B is the front and B' the hind or rear hounds; C the coupling-pole; D the cross-piece on which the levers $d$ $d'$ working the brake-blocks $e$ $e'$ are disposed; E the lock-bar, carrying the brake-blocks $e$ $e'$. F is a brace, so arranged as to allow of the easy working in it of the bolts $f$ which are pivoted in the levers $d$ $d'$. G is a well-known lever appliance for working the brake from the side, its end holding into the end of the lever $d$ at $g$. H is a pole placed on the load, which it helps to lock upon the wagon. The pole H carries the lever K, with its pawl $p$, and the rack $h$. A cord, $k$, secured to the lever K, passes over a pulley, L, at the fore end of the pole H, and thence over the pulley $l$ in the angle of the fore-hounds B. Attached to the cord $k$ is the rod or chain M which holds into the lever $d$ at $g$. The driver, pulling either upon the side-lever G or upon the top-lever K, draws upon the bolt $f$, which is hung on a pivot to the other arm of the lever $d$, and the brake-blocks are thereby applied to the wheels. The other bolt $f$ applied to the lever $d'$ remains free in the brace F. The handle N, fast to the lever $d'$, forms with it a single bent lever, and by motion to the left draws back the bolt $f$ hung on a pivot at the other extremity of $d'$, thereby also applying the brake to the wheels, and is secured to the rack $n$. By bringing into play two or more of the brake-levers at the same time great additional brake power is obtained. The springs Q serve to throw off the brake when all the levers are released.

What I claim as new, and desire to secure by Letters Patent, is—

1. The brace F, in combination with the lock-bar E and bolts $f$, or their respective equivalents, substantially as described.

2. The pole H, carrying the lever K and rack $h$, in combination with the cord $k$, pulleys L $l$, and lock-bar E, or their respective equivalents, substantially as described.

3. The combination of two or more independent brakes, applied to a wagon or other vehicle, adjusted so as to be brought into play either separately or together, substantially as described.

GEORGE S. ZIEGENFUSS.

Witnesses:
S. A. SMITH,
E. R. I. VEDERROTT.